Patented Sept. 8, 1953

2,651,625

UNITED STATES PATENT OFFICE 2,651,625

METHOD OF VULCANIZING RUBBER AND PRODUCT THEREOF

Richard O. Zerbe, Nitro, W. Va., assignor to Monsanto Chemical Company, St. Louis, Mo., a corporation of Delaware No Drawing. Application November 7, 1951, Serial No. 255,319

6 Claims. (Cl. 260—79.5)

This invention relates to the vulcanization of rubber. More particularly it relates to the vulcanization of rubber with a new class of accelerators and to the vulcanized products resulting thereby.

In the compounding of rubber, both natural and synthetic, improvements have been constantly sought, particularly in respect to the more efficient and more economical use of vulcanization accelerators. While many accelerators, per se, produce vulcanizates having acceptable physical properties, it has long been known that by the incorporation into the compounded stock of accelerators such as dibutyl ammonium oleate and diphenyl guanidine phthalate in addition to other type accelerators, such as the thiazoles, greater ease in processing and a better vulcanizate is obtained. It has become customary to denote materials such as dibutyl ammonium oleate and diphenyl guanidine phthalate and the like as activators. Similarly it is preferred to employ the new accelerators in conjunction with accelerators of other types as activators.

It is an object of this invention to provide a class of activators which are capable of assisting accelerators possessing inherent weaknesses, such as inefficient vulcanizing effect, limited solubility, and poor dispersibility in rubber stocks, thus causing uneven cures which in turn result in non-uniform properties and erratic performance in service. It is also an object of this invention to decrease the time of vulcanization. A further object is to provide a wider choice of curing conditions such that a series of combinations varying in scorch and curing properties may be obtained. For example, the ratio of activator to accelerator may vary depending upon the type of rubber, type of stock, temperature of cure, time of cure, the particular accelerator, and the objective of the compounder, i. e., whether a low or high modulus is desired or a short or long cure is required. Other objects will appear hereinafter.

It has been found in accordance with this invention that the above mentioned objects are attained by vulcanizing a vulcanizable rubber stock in which has been incorporated a member of the group of compounds comprising amic acids, or half amides of dicarboxylic acids, and their salts of the following general formula

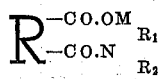

where M is hydrogen or a salt forming group such as a metal, ammonia, an amine, urea, and the like; where $R_1$ and $R_2$ are alkyl, cycloalkyl, and aralkyl groups such as methyl, ethyl, ethanol, propyl, butyl, amyl, cyclohexyl, methyl cyclohexyl, benzyl, phenethyl, and their various isomeric groups, thiocarbamyl and hydrocarbon substituted thiocarbamyl radicals, and the like, and where either or both $R_1$ or $R_2$ may be hydrogen; where R is an ethylene or propylene group or substituted homologue or analogue thereof. Among the salt forming groups are the alkali and alkaline earth metals, zinc, magnesium, and the like, ammonia, methyl amine, ethyl amine, ethanol amine, 2-cyanoethyl amine, isopropyl amine, amyl amine, butyl amine, 2-cyanobutyl amine, cyclohexylamine, benzyl amine, diethyl amine, diethanol amine, di - (2 - cyanoethyl) amine, diisopropyl amine, dibutyl amine, methyl propyl amine, dicyclohexyl amine, dibenzyl amine, piperidine, trimethyl amine, triethyl amine, and the like.

Although amic acids and their salts of the above described general formula produce good results, the best results are obtained from succinamic acid, its metal salts, and its alkyl and cycloalkyl amine salts, wherein at least one hydrogen atom of the amido nitrogen is replaced by an alkyl or cycloalkyl group. As specific examples of this group are succinamic acid, N-isopropyl succinamic acid, N-butyl succinamic acid, N-cyclohexyl succinamic acid, N,N-dicyclohexyl succinamic acid, ethyl amine salt of N-ethyl succinamic acid, butyl amine salt of N-butyl succinamic acid, diisopropylamine salt of N,N-diisopropyl succinamic acid, dicyclohexyl amine salt of N,N-dicyclohexyl succinamic acid, zinc salt of N-butyl succinamic acid, zinc salt of N-cyclohexyl succinamic acid, and the zinc salt of N,N-dicyclohexyl succinamic acid.

As illustrative of the preparation of the new activators the following is an example but it is in nowise to be considered as limitative thereof

EXAMPLE I

N-thiocarbamyl succinamic acid was prepared by the method of Pike, Ber. 6, 1105 (1873). 114.1 parts by weight of thiourea (substantially 1.5 molecular proportions) and 150.1 parts by weight of succinic anhydride (substantially 1.5 molecular proportions) were thoroughly ground together and the mixture fused at 120° C. A vigorous exothermic reaction set in at 140° C. and after the reaction subsided, the mass was cooled and extracted with 800 parts by weight of hot water. The solids were filtered off and washed thoroughly with hot water. The product so obtained melted at 210–215° C.

As exemplary of the activating properties of the amic acids the following gum stocks were compounded:

| Stock | A | B |
|---|---|---|
| Smoked sheets rubber _____ Parts by Weight__ | 100 | 100 |
| Zinc oxide _____ do____ | 5 | 5 |
| Stearic acid _____ do____ | 1 | 1 |
| Sulfur _____ do____ | 3 | 3 |
| 2,2′-Dithiobis benzothiazole _____ do____ | 0.7 | 0.7 |
| N-Thiocarbamyl succinamic acid _____ do____ | | 0.3 |

The above stocks so compounded were vulcanized in the usual manner by heating in a press for different periods of time at 135° C. The physical properties of the cured rubber stocks are set forth below:

Table I

| | Min. Cure at 135° C. | Stock A | Stock B |
|---|---|---|---|
| 700% modulus, lbs./in.² | 15 | 635 | 1,255 |
| | 45 | 2,170 | 2,430 |
| Ultimate tensile strength, lbs./in.² | 15 | 840 | 2,395 |
| | 45 | 3,235 | 3,060 |
| Ultimate elongation, percent | 15 | 750 | 875 |
| | 45 | 775 | 765 |

It is obvious from the above data the amic acids and their salts are a class of compounds which exert a marked activating effect on the cure rate and produce vulcanizates of high tensile strength in a short time. The new activators are readily compatible in rubber stocks, both natural and synthetic, and are non toxic. The amic acids also exhibit a marked activating effect on the cure rate of synthetic rubber such as GR–S.

As exemplary of the activatable organic accelerators or primary accelerators are the mercapto thiazoles, the mercapto arylene thiazoles, the thiuram mono and disulfides, the dithiocarbamates, the xanthates, and other "ultra" and "semi-ultra" vulcanization accelerators.

Smaller amounts of the amic acid activators may be employed than that indicated in the specific example. It has been found that as little as 0.2% on the rubber of amic acid is effective. Amounts higher than that specifically shown, as for example 2%, can be employed depending upon the conditions of compounding and the objectives of the compounder.

The amic acids and their salts of themselves possess vulcanization accelerator properties. For example the following natural gum rubber stocks were compounded comprising

| Stock | C | D |
|---|---|---|
| Smoked sheets rubber _____ parts by weight__ | 100 | 100 |
| Zinc oxide _____ do____ | 5 | 5 |
| Sulfur _____ do____ | 3 | 3 |
| Stearic acid _____ do____ | 1 | 1 |
| Butylamine salt of N-butyl succinamic acid_do____ | 1.5 | |
| Dicyclohexyl amine salt of N,N-Dicyclohexyl succinamic acid _____ parts by weight__ | | 1.5 |

The above stocks so compounded were vulcanized in the usual manner by heating in a press for 60 and 90 minutes respectively at 142° C. The following results were obtained on testing the cured rubber products:

Table II

| Stock | Minutes' cure at 142° C. | Modulus of Elasticity in lbs./in.² at elongations of— | | Ultimate Tensile, lbs./in.² | Ult. Elong., Percent |
|---|---|---|---|---|---|
| | | 500% | 700% | | |
| C | 60 | 360 | 1,603 | 2,197 | 770 |
| C | 90 | 518 | 1,943 | 2,658 | 790 |
| D | 60 | 335 | 1,420 | 2,453 | 788 |
| D | 90 | 530 | 2,045 | 2,825 | 773 |

By the term "rubber" as employed in the appended claims is meant natural as well as synthetic rubbers which are capable of vulcanization when heated with sulfur and includes latices and reclaims of such materials whether or not admixed with pigments, fillers, softeners, antioxidants, etc.

While specific embodiments of the invention have been described herein, it will be understood that the invention is not so limited but that various modifications may be made therein without departing from the spirit of the invention or from the scope of the appended claims.

This application is a continuation-in-part of application Serial No. 71,400, filed January 17, 1949.

What is claimed is:

1. The method of vulcanizing a rubber which comprises heating a rubber and sulfur in the presence of a small amount of a compound selected from the group consisting of acids of the structure

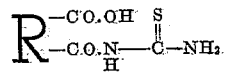

and salts thereof where R is an alkylene group containing more than one but less than four carbon atoms.

2. The method of vulcanizing a rubber which comprises heating a rubber and sulfur in the presence of 0.2% to 2.0% on the weight of the rubber of a succinamic acid of the structure

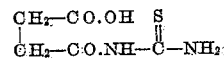

3. The method of vulcanizing a rubber which comprises heating a rubber and sulfur in the presence of a thiazole accelerator and 0.2%–2.0% on the weight of the rubber of a succinamic acid of the structure

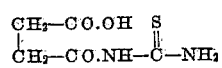

4. The vulcanized rubber product obtained by heating a rubber and sulfur in the presence of a small amount of a compound selected from the group consisting of acids of the structure

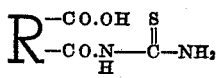

and salts thereof where R is an alkylene group containing more than one but less than four carbon atoms.

5. The vulcanized rubber product obtained by heating a rubber and sulfur in the presence of 0.2% to 2.0% on the weight of the rubber of a succinamic acid of the structure

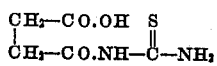

6. The vulcanized rubber product obtained by heating a rubber and sulfur in the presence of a thiazole accelerator and 0.2%–2.0% on the weight of the rubber of a succinamic acid of the structure

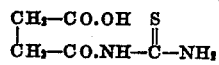

RICHARD O. ZERBE.

References Cited in the file of this patent

UNITED STATES PATENTS

| Number | Name | Date |
|---|---|---|
| 2,582,732 | Zerbe | Jan. 15, 1952 |